United States Patent Office 3,595,875
Patented July 27, 1971

3,595,875
PREPARATION OF 2-PYRROLIDINONE
John M. Larkin, Wappingers Falls, and Kenneth L. Kreuz, Fishkill, N.Y., assignors to Texaco Inc., New York, N.Y.
No Drawing. Filed Dec. 9, 1968, Ser. No. 782,433
Int. Cl. C07d 27/08
U.S. Cl. 260—326.5                11 Claims

ABSTRACT OF THE DISCLOSURE

A method for preparing 2-pyrrolidinone by contacting 5-nitro-3-pentanone with an acidic oxidizing agent thereby forming 4-nitrobutyric acid and thereafter hydrogenating the 4-nitrobutyric acid in an alcoholic medium in the presence of a minor amount of a mineral acid and a hydrogenating catalyst at temperatures ranging from about 20 to 200° C. and under hydrogen pressures of from 1 to 100 atmospheres. The product 2-pyrrolidinone contemplated herein is useful as a solvent for polymers, insecticides and petroleum processing and separations, as a plasticizer for acrylic polymers and copolymers, as a decolorizing agent, and as a monomer for forming a polyamide.

This invention relates to a process for producing 2-pyrrolidinone. In particular, it relates to a novel method for preparing 2-pyrrolidinone from 5-nitro-2-pentanone.

In the past, the preparation of 2-pyrrolidinone has been accomplished by the hydrogenation and cyclization of succinonitriles; also known is the synthesis of 2-pyrrolidinone from acetylene, formaldehyde and ammonia. Although such reactions produced 2-pyrrolidinone certain disadvantages were attendant in the method of preparation including costly starting materials and the necessity to utilize high pressure reactions and reactors.

A novel method has now been found whereby 2-pyrrolidinone can be produced in high yields and in the substantial absence of by-product formation which permits processing without the necessity of utilizing complicated and expensive purification procedures. Further, the process is amenable to the preparation of 2-pyrrolidinone where substantially lower processing pressures are employed.

It is therefore an object of this invention to provide a method for the preparation of 2-pyrrolidinone.

Another object of this invention is to provide a method for the preparation of 2-pyrrolidinone in high yields.

Yet another object of this invention is to provide a method for the preparation of 2-pyrrolidinone in the absence of substantial by-product formation.

Other objects and advantages will become apparent from a reading of the following detailed description and examples.

Broadly, this invention contemplates a method of preparing 2-pyrrolidinone which comprises contacting 5-nitro-2-pentanone with an acidic oxidizing agent thereby forming 4-nitrobutyric acid. Thereafter, 4-nitrobutyric acid is hydrogenated in an alcoholic medium in the presence of a mineral acid and a hydrogenation catalyst. The catalyst is preferably selected from the groups of platinum metals catalysts and the hydrogenation is conducted at temperatures of from 20° C. to 200° C. under a hydrogen pressure of from 1 to 100 atmospheres.

According to this invention 4-nitrobutyric is derived from 5-nitro-2-pentanone. The nitrocarbonyl, 5-nitro-2-pentanone, contemplated as starting material above is prepared by contacting 2-methyl-1-pentene with dinitrogen tetroxide and oxygen at a temperature of between —40 and 20° C. to form a nitroalkyl peroxynitrate. The intermediate nitroalkyl peroxynitrate is thereafter contacted with a reducing agent at a temperature of between —20 and 30° C. fo form the vicinal nitroalkyl nitrate 1-nitro-2-methyl-2-pentyl nitrate in accordance with the procedure described in U.S. Pat. 3,282,983. The vicinal nitroalkyl nitrate so prepared is subsequently converted to the dinitroalcohol 1,5-dinitro-2-methyl-2-pentanol by heating the nitrate at a temperature of at least 100° C. thereby thermally rearranging the vicinal nitroalkyl nitrate to a dinitroalcohol in accordance with the procedure described in copending application Ser. No. 686,820 filed Nov. 30, 1967, entitled "Preparation of Dinitroalcohols" by John M. Larkin and assigned to the assignee hereof. The dinitroalcohol 1,5-dinitro-2-methyl-2-pentanol is in turn converted to 5-nitro-2-pentanone by contacting the alcohol with an alkaline agent at a temperature of from about 20 to 200° C. in accordance with the procedure described in copending application Ser. No. 706,760, filed Feb. 20, 1968 by John M. Larkin and assigned to the assignee hereof.

More specifically, the process of this invention comprises contacting 5-nitro-2-pentanone with an acidic oxidizing agent selected from the group consisting of nitric acid and solutions of salts of permanganic acid acidified with a mineral acid, such as potassium permanganate and sulfuric acid, sodium permanganate and sulfuric acid or potassium permanganate and phosphoric acid at a temperature sufficient to convert said 5-nitro-2-pentanone to 4-nitrobutyric acid.

The reaction temperatures employed in this first step may vary between about 20 and 100° C. and preferably between 40 and 80° C. Temperatures above 100° C. promote the formation of other acid products and other undesirable side reactions such as further oxidation of the 4-nitrobutyric acid while temperatures below 20° C. excessively prolong reaction times. The amount of acidic oxidizing agent employed is essentially stoichiometric but practical amounts may range between about 1 to 15 oxygen equivalents of agent per mole of 5-nitro-2-pentanone. The reaction time is normally between a few minutes and 24 hours although longer and shorter periods may be employed.

The 4-nitrobutyric acid prepared above may be recovered if desired by standard means as for example by selective distillation and extraction from the reaction zone in purities of 95 percent or higher.

The 4-nitrobutyric acid prepared above and recovered if desired from the first step is converted to 2-pyrrolidinone in quantiative yield by hydrogenation in an alcoholic medium in the presence of a minor amount of a mineral acid and a hydrogenationcatalyst preferably selected from the groups of platinum metals at temperatures ranging from about 20 to 200° C., under hydrogen pressures ranging from 1 to 100 atmospheres of hydrogen and preferably between 5 and 40 atmospheres of hydrogen.

In general, conventional and well-known hydrogenation catalysts may be employed in this stage of the process including nickel, cobalt, iron and rhenium metals or compounds thereof supported or unsupported and with or without promoters. Preferably we employ platinum metals catalysts including the light platinum group comprising ruthenium, rhodium and palladium and the heavy platinum group comprising osmium, iridium and platinum. The catalyst may be employed as the respective metal, oxide or salt such as platinum dichloride, palladium dichloride, rhodium oxide, rhodium trichloride, ruthenium trichloride, iridium dichloride, osmium tetrachloride, platinum and palladium. Preferably we employ platinum dichloride and palladium dichloride.

Applicable mineral acids include hydrochloric acid, sulfuric acid, phosphoric acid, nitric acid and para-toluene sulfonic acid. Preferably we employ hydrochloric acid.

Alcoholic media employed in this invention include methanol, ethanol, propanol, isopropanol, butanol, isobutanol, hexanol, octanol, isooctanol and dodecanol. Preferably we employ alcohols having from 1 to 8 carbon atoms.

The amount of mineral acid employed in this stage of the reaction may vary from about 0.001 to 0.1 equivalent, preferably 0.01 to 0.05 equivalent, of acid per mole of 4-nitrobutyric acid. The amount of catalyst may vary from about 0.001 to 20 weight percent, preferably 0.1 to 1.0, based on the weight of 4-nitrobutyric acid. Reaction times of from about 0.25 to 8 hours are customarily employed although longer and shorter periods may be applicable.

The 2-pyrrolidinone product is thereafter recovered by standard recovery procedures, for example, by filtration of the catalyst followed by distillation of the alcoholic medium. Inasmuch as the conversion of the 4-nitrobutyric acid to 2-pyrrolidinone is quantitative the recovered product is of high quality and purity.

The 2-pyrrolidinone prepared according to this invention is useful as a solvent for polymers and insecticides, as a solvent in petroleum processing and separation, as a plasticizer for acrylic polymers and copolymers and as a decolorizing agent for kerosene and other hydrocarbons. In addition, 2-pyrrolidinone may be base catalyzed to a high molecular weight linear nylon-like polyamide.

In order to more fully illustrate the nature of our invention and manner of practicing the same the following examples are presented.

EXAMPLE I

A solution of 8.4 grams of 2-methyl-1-pentene in 100 milliliters of carbon tetrachloride was maintained at 0 to 2° C. while a mixture of 6.1 milliliters of liquid nitrogen dioxide and 60.5 milliliters per minute of oxygen were introduced over a 5 hour period. The solution was purged with nitrogen and treated with nitric oxide introduced at the rate of 60.5 milliliters per minute at −10 to −15° C. for 35 minutes. The carbon tetrachloride was subsequently removed by vacuum distillation and the recovered liquid, 19.21 grams, was identified as 1-nitro-2-methyl-2-pentyl nitrate.

A solution of 3.5 grams of 1-nitro-2-methyl-2-pentyl nitrate in 100 milliliters of an inert medium consisting of a linear polymer having a molecular weight of 775 with repeating $CF_2CFCl$ units was heated to a temperature of 125 to 128° C. for 2¼ hours. The solution was cooled and extracted with methanol and a total of 1.44 grams of liquid product identified by infrared to be 1,5-dinitro-2-methyl-2-pentanol was obtained.

To a solution of 2.29 grams of 1,5-dinitro-2-methyl-2-pentanol in 50 milliliters of methanol there was added 4 grams of sodium carbonate. The mixture was allowed to stand overnight, insolubles filtered off, the solvent evaporated under vacuum and a pasty orange solid recovered. The solid was mixed with 50 milliliters of water, the mixture extracted with 50 milliliters of ether, the ether removed by evaporation and 0.94 gram of filtrate was obtained identified by infrared to be 5-nitro-2-pentanone.

EXAMPLE II

To 4 milliliters of nitric acid maintained at 50 to 60° C. there was added dropwise 0.48 gram of 5-nitro-2-pentanone and the solution was maintained at this temperature for an additional half-hour and thereafter poured into 100 milliliters of ice water. A turbid yellow solution resulted and the aqueous solution was extracted with 100 milliliters of ether, the ether extract was dried over anhydrous magnesium sulfate, the ether removed under vacuum leaving a yellow liquid, 0.33 gram, which slowly evolved a brown gas. This liquid was partitioned between ether and saturated sodium hydrogen carbonate solutions. The sodium hydrogen carbonate solution was withdrawn and slowly acidified with 1.5 N HCl. The resultant solution was nearly saturated with sodium chloride and extracted with ether. The ether extract was dried over anhydrous magnesium sulfate and the solvent stripped off under vacuum. A viscous yellow liquid 0.16 gram (32% yield), was identified by infrared to be 4-nitrobutyric acid.

EXAMPLE III

There is prepared 15.0 grams of 4-nitrobutyric acid by the procedure described above. To a solution of 15.0 grams of 4-nitrobutyric acid and 300 milliliters of ethanol, there is added 1.0 gram of 10 percent palladium dichloride supported on carbon and 0.5 milliliter of concentrated hydrochloric acid. This mixture is charged to a reactor and the reactor pressured to 500 p.s.i.g. with hydrogen. The reactor is rocked at 200°–206° F. for 4 hours.

The solution is thereafter cooled and the catalyst removed by filtration. The solvent is removed by evaporation under vacuum at about 40° C. There is recovered a clear liquid weighing 9.52 grams (94.4% yield) and is identified to be 2-pyrrolidinone.

We claim:
1. A method of preparing 2-pyrrolidinone which comprises:
   (a) contacting 5-nitro-2-pentanone with an acidic oxidizing agent selected from the group consisting of nitric acid and solutions of salts of permanganic acid acidified with a mineral acid thereby froming 4-nitrobutyric acid, and
   (b) hydrogenating said 4-nitrobutyric acid in a liquid alkanol medium having from 1 to 12 carbon atoms in the presence of a mineral acid and a hydrogenation catalyst selected from the group consisting of metals, oxides and salts of nickel, cobalt, iron, rhenium and platinum metals groups.
2. A method according to claim 1 wherein said acidic oxidizing agent is present in an amount of about 1 to 15 oxygen equivalents of said agent per mole of said 5-nitro-2-pentanone.
3. A method according to claim 1 wherein step (a) is conducted at a temperature of from 20 to 100° C.
4. A method according to claim 1 wherein step (b) is conducted at a temperature of from 20 to 200° C.
5. A method according to claim 1 wherein said hydrogenation catalyst is selected from the group consisting of metals, oxides and salts of the groups of platinum metals.
6. A method according to claim 5 wherein said catalyst is palladium dichloride.
7. A method according to claim 5 wherein said catalyst is platinum dichloride.
8. A method according to claim 1 wherein said alkanol medium is a $C_1$ to $C_8$ alcohol.
9. A method according to claim 1 wherein said mineral acid is hydrochloric acid.
10. A method according to claim 1 wherein said mineral acid is present in an amount of from about 0.001 to 0.1 equivalent per mole of 4-nitrobutyric acid.
11. A method according to claim 1 wherein step (b) is conducted at a pressure of from 1 to 100 atmospheres of hydrogen.

References Cited
UNITED STATES PATENTS 2,702,801    2/1955    Donaruma et al. _____ 260—239.3

ALEX MAZEL, Primary Examiner

J. A. NARCAVAGE, Assistant Examiner

U.S. Cl. X.R.

260—526